INVENTOR.
Ernst Holz
BY Michael S. Striker
Attorney

United States Patent Office 3,605,835
Patented Sept. 20, 1971

3,605,835
CUTTING APPARATUS FOR FOODSTUFFS
AND THE LIKE
Ernst Holz, Hauptstrasse 76, Heidenheim-
Schnaitheim, Germany
Filed July 9, 1969, Ser. No. 840,356
Claims priority, application Germany, July 12, 1968,
P 17 79 153.6
Int. Cl. B26d 3/26
U.S. Cl. 146—78R                    10 Claims

ABSTRACT OF THE DISCLOSURE

A receptacle has an inlet opening at one side and an outlet opening at another side inclined to the one side. Cutter means extends across the outlet opening so as to cut material issuing therethrough. Pusher means is mounted for advancing the receptacle in direction towards the outlet opening so as to push material therethrough. A hopper communicates with the inlet opening for introducing material into the receptacle. A severing blade is mounted for movement across the inlet opening at least substantially in the general plane of the latter to thereby sever and separate the material in the receptacle from the material in the hopper means.

BACKGROUND OF THE INVENTION

The present invention relates to a cutting apparatus in general, and more particularly to a cutting apparatus for foodstuffs and the like. Still more specifically the invention relates to a cutting apparatus for sliceable foodstuffs and the like.

It is already known to introduce foodstuffs or analogous material which is to be sliced into strips, rods, cubes, dice or the like, into a receptacle having an outlet opening across which a suitable cutter means extends. Such cutter means may be in form of a single set of cutter knives spaced from one another so that the material, which is subsequently pushed through the outlet opening into the path of the cutter knives, is sliced. Then a second set of cutter knives may extend transversely of the first set so that the material is sliced in two mutually normal directions whereby it issues in form of rods to be sliced in a third direction and thereby converted into cubes or dice. In cutting apparatus of this type a problem exists in the supply of the material which is to be cut.

In one known cutting apparatus of the general type in question the material to be cut is simply introduced into the receptacle through the inlet opening thereof, and is then pushed through the outlet opening into the path of the cutter knife. In another embodiment there are two chambers provided in magazine-fashion so that one chamber containing material to be cut is moved into registry with the outlet opening and the material pushed therethrough, while the other chamber is being filled with material to be cut. Thereupon the other chamber is moved into registry and the material pushed through the outlet opening whereas the first and now empty chamber is being filled. The problem with both of these constructions is that they are simply not suitable for high-speed production, that is for cutting of large quantities of material.

Another known cutting apparatus of this type utilizes a magazine which can be moved from a filling position in which its upper open end is in registry with the hopper, to an operating position in which the magazine moves into registry with the outlet opening across which the cutter knives extend, so that the material previously introduced into the magazine from the hopper can be pushed through this outlet opening by suitable instrumentalities. As the magazine moves from filling position to operating position one horizontal plate provided on an upper edge of the magazine moves under the opening of the hopper to prevent material from falling out of the same, whereas a second horizontal plate, connected at the lower edge of the hopper, surrounding the outlet opening thereof, covers the upper open side of the magazine while the same is in operating position. However, this construction is bulky, relatively complicated, and—worse—makes it completely or at least substantially impossible to subject the material in the magazine to any pre-compression.

This is a very important disadvantage because pre-compression of the material in the magazine, that is precompression of the material before it is pushed through the outlet opening of the receptacle against the cutter knives, greatly improves the quality of the cuts and also increases the capacity of the apparatus because evidently the quantity which can be introduced into the magazine with each filling is greater than would otherwise be possible. An additional advantage of obtaining pre-compression of the material is found in circumstances where the material is to be cubed or diced and where the cubes or dice must be perfectly cubed. In these circumstances the quantity of rejects, that is of imperfectly shaped cubes or dice, is reduced if the material can be subjected to pre-compression because this results in complete filling of all corners and spaces in the magazine and thus avoids or at least substantially produces the production of rejects.

Finally, it is a further disadvantage of known cutting apparatus of the type in question that it is difficult to gain access to the receptacle for cleaning purposes. This, however, is of utmost importance in the processing of foodstuffs.

SUMMARY OF THE INVENTION

It is, accordingly, a general object of the present invention to overcome the aforementioned disadvantages of the prior-art construction.

More particularly it is an object of the present invention to provide a cutting apparatus for sliceable foodstuffs and the like which is not possessed of these disadvantages.

An additional object of the invention is to provide such an apparatus which makes possible economical processing of large quantities of materials.

A concomitant object of the invention is to provide such a cutting apparatus which can be automated in its operation to a significant extent.

Still a further object of the invention is to provide such an apparatus which is simple in its construction and reliable in its operation.

A further object of the invention is to provide such a cutting apparatus wherein the material to be cut can be subjected to pre-compression in the receptacle.

Still an additional object of the invention is to provide such an apparatus which can be simply, quickly and thoroughly cleaned.

In pursuance of the above objects, and others which will become apparent hereafter, one feature of my invention resides, briefly stated, in a cutting apparatus for sliceable foodstuffs and the like which comprises a receptacle having an inlet opening at one side and an outlet opening at another side inclined to said one side. Cutter means extends across the outlet opening for cutting material passing therethrough. Pusher means is mounted for advancement in the receptacle in a predetermined path towards the outlet opening so as to push material in the receptacle through the outlet opening for cutting by the cutter means. Hopper means communicates with the inlet opening exteriorly of the receptacle for introduction of material to be cut into the latter. Finally, I provide severing means which is mounted for movement across the inlet opening at least substantially in the general plane of the same, whereby to sever and separate the material in the receptacle from the material in the hopper means.

According to the present invention the severing means is so constructed and configured that as it moves across the inlet opening in the general plane of the same it not only severs and separates the material in the receptacle from the material in the hopper, but also effects pre-compression of the material contained in the receptacle. Furthermore, it does so while effecting clean severing of the material in the receptacle from the material in the hopper without tearing of the material.

Tests with an apparatus according to the invention have shown that with this construction it is possible to obtain a high degree of automation, to have cuts of excellent quality to attain maximum material throughput per time unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
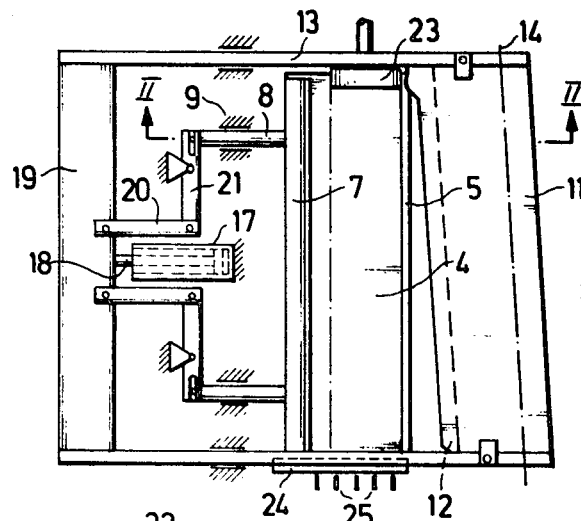
FIG. 1 is a diagrammatic top-plan view of an apparatus according to the present invention, with the inlet opening shown uncovered and with the hopper removed for clarity.

Discussing the drawing in detail it will be seen that the receptacle is generally identified with reference numeral 4. In the illustrated embodiment it comprises an immovable side wall 5, a bottom wall 6 and a side wall 7 which is movable in direction towards and away from the side wall 5, as is most clearly evident by comparison of FIGS. 2 and 3. The side wall 7 thus constitutes a pre-compressing member and it is evident particularly from FIGS. 2 and 3 that it is guided by means of guide rods 8 (only one shown in FIGS. 2 and 3, both shown in FIG. 1) on the support structure 9 for movement in the direction of the arrow associated with the guide rod visible in FIG. 2.

The inlet opening of the receptacle 4 is identified with reference numeral 10 (compare FIG. 2) and a slide member 11 is provided having a cutter blade 12. The slide member 11 is movable across the inlet opening 10 in the direction of the arrow shown in FIG. 2, and the cutting edge of the cutting blade 12 moves at least substantially in the general plane of the inlet opening 10. A frame 13 (see FIG. 1) supports the slide member 11 which latter is pivotable about the axis 14. A counter- or cut-off bar 16 is provided at an upper edge of the movable side wall 7, and an adjusting screw 15 provided on the slide member 11 makes it possible to precisely adjust the positioning of the cutter edge of the cutting blade 12—because of the pivoting mounting of the side member 11—so that the cutting edge of the cutter blade 12 may be adjusted to be precisely aligned with the upper open edge of the bar 16. The provision of the bar 16, and the possibility of adjusting the cutting edge of the cutting blade 12 with reference to the bar 16, greatly increases the quality of the cutting action obtained, particularly if in accordance with a preferred embodiment of the invention, the cutting edge of the cutter blade 12 is inclined with respect to the longitudinal extension of the inlet opening 10, as clearly evident from FIG. 1, because this results in a scissors-like cutting action which significantly reduces the cutting forces required and accordingly the energy requirement for effecting the movement of the side member 11 and its associated cutter blade 12.

The frame 13 is mounted on the support 9 in such a manner as to be movable transversely of the elongation of the receptacle 4, that is in the same direction as the slide member 11.

Figure 2:
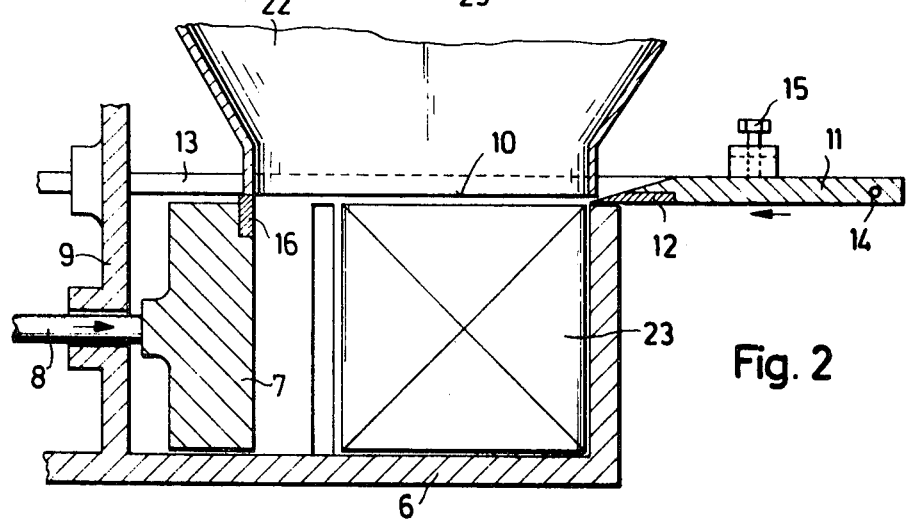
FIG. 2 is a section taken on the line II—II of FIG. 1, with the hopper shown in place.
Figure 3:
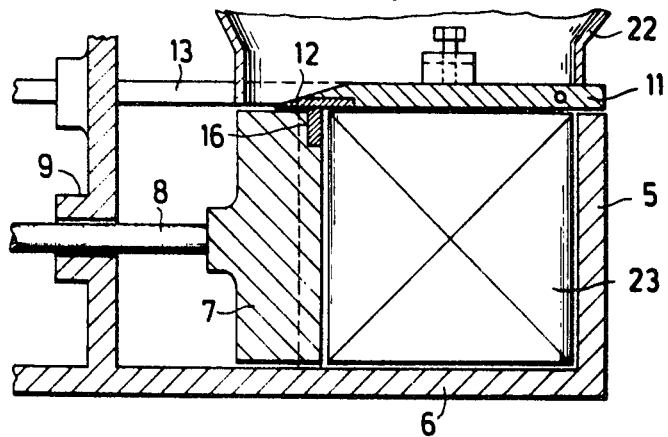
FIG. 3 is a sectional view analogous to FIG. 2 but showing the inlet opening in closed condition.

In the illustrated embodiment a hydraulic servomotor 17 is mounted on the support 9 and serves to effect shifting of the slide member 11 as well as of the movable side wall 7 from the positions illustrated in FIG. 2 to the positions illustrated in FIG. 3, and vice versa. Of course, other means for this purpose will offer themselves readily to those skilled in the art. In the illustrated embodiment, however, it is the piston 18 of the hydraulic servomotor 17 which acts upon a traverse member 19 of the frame 13 (compare FIG. 1), motion-transmission being effected via the linkage rod 20 and levers 21 whose mounting and connection is diagrammatically illustrated in FIG. 1 in a manner thought to be sufficient for a clear understanding. It is evident from FIG. 1 that motion is transmitted from the servomotor 17 to the movable side wall 7 in such a manner that the latter moves in the direction opposite to the direction of movement of the slide member 11, as also evident from the arrows associated with elements 8 and 11 in FIG. 2.

A feed hopper is identified with reference numeral 22 and communicates with the inlet opening 10 of the receptacle 4. FIG. 1 shows that the feed hopper is elongated and extends over the entire elongation of the inlet opening 10, its outlet aperture having a width corresponding—as readily visible in FIG. 2—to the maximum width of the inlet opening 10 when the movable side wall 7 is retracted to the fullest extent possible, that is when the movable side wall 7 is in the position shown in FIG. 2.

Material which is introduced from the feed hopper 22 through the inlet opening 10 into the interior of the receptacle 4 is thus pre-compressed in response to movement of the movable side wall 7 in the direction of the arrow associated with the element 8 in FIG. 2, that is movement in the sense shown in FIG. 3. Simultaneously the slide member 11 moves in opposite direction, closing the inlet opening 10 and the outlet aperture of the feed hopper 22, and cleanly severing the material and separating that material which is located in the receptacle 4 from the material remaining in the feed hopper 22. No squeezing, tearing or similar damage of the material occurs.

As soon as the slide member 11 has moved to its end position shown in FIG. 3, wherein it completely closes the inlet opening 10, a pusher member 23 located at one end of the receptacle 4 (compare FIG. 1) advances in direction towards the other end at which the receptacle 4 is provided with an outlet opening across which extends cutter knives 24 and 25, of which those identified with reference numeral 24 extend horizontally whereas those identified with reference numeral 25 extend vertically, that is normal to the ones identified with reference numeral 24. These cutter knives 24 and 25 are shown in FIG. 1 in diagrammatic form only because the particular configuration, construction, mounting and reciprocatory movement do not constitute a part of the present invention. The pre-compressed material in the interior of the receptacle 4 is pushed by the pusher member 23 against the cutter knives 24 and 25 and is cut by the same into elongated rods which may again be cut into cubes with an additional cutter knife provided downstream of the cutter knives 24 and 25. This is not illustrated as not being essential for the invention. Similarly, the drive for the pusher member 23 is entirely conventional and is not illustrated, being well known to those skilled in the art. It is evident, of course, that when the pusher member 23 has advanced into the receptacle 4 to the maximum extent, that is usually to the outlet opening just upstream of the cutter knives 24 and 25, it must be again withdrawn to its starting position shown in FIG. 1. How this is done is also known in the art and requires no discussion.

It goes without saying that in place of the mechanical motion-transmitting arrangement between the movable side wall 7 and the slide member 11 both elements could be hydraulically or electrically coupled for movement, and that in place of a single drive each of these elements could be provided with a separate drive motor, which may again be hydraulic, electric or indeed of any suitable type.

It will be understood that each of the elements described above, or two or more together, may also find a useful application in other types of constructions differing from the types described above.

While the invention has been illustrated and described as embodied in a cutting apparatus for sliceable foodstuffs and the like, it is not intended to be limited to the details shown, since various modifications and structural changes may be made without departing in any way from the spirit of the present invention.

What is claimed is:

1. A cutting apparatus for sliceable foodstuffs and the like, comprising a receptacle having an inlet opening at one side and an outlet opening at another side inclined to said one side; pusher means for advancement in said receptacle in a predetermined path toward said outlet opening so as to push material in said receptacle through said outlet opening; hopper means communicating with said inlet opening exteriorly of said receptacle for introduction of material to be cut; compressing means for compressing material in said receptacle in direction transversely of said predetermined path preliminary to advancement of said pusher means in said path; severing means mounted for movement across said inlet opening at least substantially in the general plane of the same, whereby to sever and separate the compressed material in said receptacle from the material in said hopper means; and cutter means extending across said outlet opening for cutting the compressed material passing therethrough in response to advancement of said pusher means toward said outlet opening subsequent to compressing of said material by said compressing means.

2. A cutting apparatus as defined in claim 1, said severing means comprising a carrier member mounted for movement across said inlet opening, and at least one severing blade having a cutting edge located at least substantially in said general plane of said inlet opening.

3. A cutting apparatus as defined in claim 1, said severing means being arranged at one side of said predetermined path and movable towards the other side thereof, across said inlet opening, and said compressing means being arranged at said other side and movable toward said one side of said predetermined path.

4. A cutting apparatus as defined in claim 3, said receptacle comprising a plurality of walls, and said compressing means being constituted by a movable one of said walls.

5. A cutting apparatus as defined in claim 4, said movable wall having a free edge bounding in part said inlet opening and constituting a cut-off edge cooperating with said severing means.

6. A cutting apparatus as defined in claim 2, wherein said cutting edge extends at an angle to the direction of movement of said carrier member.

7. A cutting apparatus as defined in claim 2; and further comprising adjusting means operative for adjusting said cutting edge in direction normal to said general plane of said inlet opening.

8. A cutting apparatus as defined in claim 7, said adjusting means including mounting means mounting said carrier member for turning movement about an axis located at least substantially in said general plane of said inlet opening spaced from said cutting edge and at least substantially parallel to the latter and transverse to the direction of movement of said carrier member.

9. A cutting apparatus as defined in claim 4, said receptacle having an inner cross-sectional area which is variable between a maximum and a minimum value in dependence upon movement of said one wall in direction transversely to said predetermined path, and said inlet opening having a cross-sectional area corresponding to said maximum value.

10. A cutting apparatus as defined in claim 9, said hopper means having an outlet aperture communicating with said inlet opening and having a cross-sectional area also corresponding to said maximum value.

References Cited

UNITED STATES PATENTS

| | | | |
|---|---|---|---|
| 1,046,551 | 12/1912 | Cass | 146—78 |
| 1,827,977 | 10/1931 | Erl | 146—78X |
| 2,889,878 | 6/1959 | White et al. | 146—151X |

WILLIE G. ABERCROMBIE, Primary Examiner